(12) United States Patent
Partridge et al.

(10) Patent No.: US 11,873,453 B2
(45) Date of Patent: Jan. 16, 2024

(54) ADSORPTIVE PROCESS FOR SEPARATION OF ISOPARAFFINIC LUBE BASE STOCK FROM LOWER QUALITY OILS

(71) Applicant: ExxonMobil Technology and Engineering Company, Annandale, NJ (US)

(72) Inventors: Randall D. Partridge, Califon, NJ (US); Changyub Paek, Bridgewater, NJ (US); Yogesh V. Joshi, Bridgewater, NJ (US); Carmen C. Lasso, Newark, NJ (US); Scott J. Weigel, Allentown, PA (US)

(73) Assignee: EXXONMOBIL TECHNOLOGY AND ENGINEERING COMPANY, Annandale, NJ (US)

( * ) Notice: Subject to any disclaimer, the term of this patent is extended or adjusted under 35 U.S.C. 154(b) by 0 days.

(21) Appl. No.: 17/664,171

(22) Filed: May 19, 2022

(65) Prior Publication Data

US 2022/0389331 A1 Dec. 8, 2022

Related U.S. Application Data

(60) Provisional application No. 63/194,292, filed on May 28, 2021.

(51) Int. Cl.
*C10G 25/03* (2006.01)
*B01J 20/18* (2006.01)
(Continued)

(52) U.S. Cl.
CPC .............. *C10G 25/03* (2013.01); *B01J 20/18* (2013.01); *B01J 20/2808* (2013.01);
(Continued)

(58) Field of Classification Search
CPC ........ C10G 21/28; C10G 25/03; C10G 25/12; C10G 2300/1037; C10G 2300/301;
(Continued)

(56) References Cited

U.S. PATENT DOCUMENTS 4,076,842 A   2/1978 Plank et al.
4,487,688 A * 12/1984 Dessau ..................... C07C 7/13
                                                    585/820
(Continued)

FOREIGN PATENT DOCUMENTS

EP        0187522 B2      7/1999

OTHER PUBLICATIONS

Lewis, W.K., et al., 1950, Industrial and Engineering Chemistry, 42(7), 1319-1326. (Year: 1950).*
(Continued)

*Primary Examiner* — Brian A McCaig
(74) *Attorney, Agent, or Firm* — SHOOK, HARDY & BACON L.L.P.

(57) ABSTRACT

Provided herein are methods and systems of making a high quality isoparaffinic base stock which include contacting an adsorbent material with a hydrocarbon feedstock and a solvent and separating at least some of the one or more high VI components from the hydrocarbon feedstock to produce a first fraction base stock having a first fraction base stock viscosity index. The adsorbent material is desorbed with a second solvent to produce a second fraction base stock having a second fraction base stock viscosity index. In these methods, the first fraction base stock viscosity index is less than the hydrocarbon feedstock viscosity index and the second fraction base stock viscosity index is greater than the hydrocarbon feedstock viscosity index.

26 Claims, 9 Drawing Sheets

(51) Int. Cl.
    *B01J 20/28*         (2006.01)
    *C10G 21/28*        (2006.01)
    *B01J 20/34*         (2006.01)
    *C10G 25/12*        (2006.01)

(52) U.S. Cl.
    CPC .......... *B01J 20/3408* (2013.01); *C10G 21/28* (2013.01); *C10G 25/12* (2013.01); *C10G 2300/1037* (2013.01); *C10G 2300/301* (2013.01); *C10G 2300/302* (2013.01)

(58) Field of Classification Search
    CPC . C10G 2300/302; B01J 20/18; B01J 20/2808; B01J 20/3408
    See application file for complete search history.

(56) References Cited

U.S. PATENT DOCUMENTS

| | | | |
|---|---|---|---|
| 4,827,064 A | | 5/1989 | Wu |
| 4,827,073 A | | 5/1989 | Wu |
| 4,956,122 A | | 9/1990 | Watts et al. |
| 5,164,169 A | * | 11/1992 | Rubin .................. B01J 29/7007 |
| | | | 423/709 |
| 5,907,073 A | * | 5/1999 | Ghosh ...................... C07C 2/66 |
| | | | 502/67 |
| 6,207,604 B1 | * | 3/2001 | Yamamoto ............. B01D 53/02 |
| | | | 502/64 |
| 11,213,810 B1 | * | 1/2022 | Ding .................... B01J 29/7815 |
| 2018/0079970 A1 | * | 3/2018 | Chawla ................. C10G 25/03 |

OTHER PUBLICATIONS

Lewis, W.K., et al., 1950, Industrial and Engineering Chemistry, 42(7), 1326-1332. (Year: 1950).*

* cited by examiner

ADSORPTIVE PROCESS FOR SEPARATION OF ISOPARAFFINIC LUBE BASE STOCK FROM LOWER QUALITY OILS

CROSS-REFERENCE TO RELATED APPLICATION

This application claims the benefit of U.S. Provisional Patent Application No. 63/194,292 filed May 28, 2021 entitled ADSORPTIVE PROCESS FOR SEPARATION OF ISOPARAFFINIC LUBE BASE STOCK FROM LOWER QUALITY OILS, the entirety of which are incorporated by reference herein.

FIELD

The present disclosure generally relates to lubricating oil base stock and more particularly relates to process of upgrading base stocks by separating isoparaffinic base stock from lower quality base stock.

BACKGROUND

Demand for Group III and III+ lubricating oil base stock is growing while use of Group I and Group II lube oils is in decline. Therefore, upgrading lower quality base stock to higher quality is desirable. Group II base stocks and Group III base stocks produced by hydrocracking and or hydroisomerization contain substantial concentrations of isoparaffins. Group II is defined by API as having a viscosity index ("VI") of 80 to 120 and greater than 90 percent saturates with less than 0.03 percent sulfur. Group II base stock often contains single and multi-ring naphthenes, isoparaffins and possibly even small amounts of n-paraffins. Group III base stock is defined by API as having a viscosity index greater than 120 and greater than 90 percent saturates with a sulfur content of less than 0.03 percent. Group III base stock is isoparaffinic, but can contain substantial alkyl-monocycloparaffins and multi-ring cycloparaffins. In most hydrocracked Group II and III base stocks, aromatic compound content is low.

Group III base stock can be produced from paraffinic feedstocks. Often greater than 50 percent of a Group III base stock is isoparaffinic. Certain Group III base stocks are produced from paraffin wax, including wax from Fisher-Tropsch processes and hydrocracking products thereof, as well as petroleum wax, including slackwaxes, by hydroisomerization and hydrofinishing. Hydrocracking and catalytic dewaxing of paraffinic vaccum gas oil ("VGO") can also be used to produce Group III base stocks. Each of these upgrading processes, however, adds costs to the end product and can be inefficient to make using traditional routes.

SUMMARY

Presented herein are methods of making a high quality isoparaffinic base stock comprising: providing a hydrocarbon feedstock having a hydrocarbon feedstock viscosity index comprising one or more high VI components; providing a first solvent; contacting an adsorbent material with the hydrocarbon feedstock and the first solvent; separating at least some of the one or more high VI components from the hydrocarbon feedstock to produce a first fraction base stock having a first fraction base stock viscosity index; contacting the adsorbent material with a second solvent; and desorbing the adsorbent material to produce a second fraction base stock having a second fraction base stock viscosity index. In these methods, the first fraction base stock viscosity index is less than the hydrocarbon feedstock viscosity index and the second fraction base stock viscosity index is greater than the hydrocarbon feedstock viscosity index.

Also provided herein are methods of upgrading Group II base stock to Group II+, Group III or Group III+ base stock comprising adsorbing one or more high VI components of a first Group II base stock feed having a first Group II viscosity index with a Beta zeolite to provide a second Group II base stock with a viscosity index less than the first Group II base stock feed, and desorbing the Beta zeolite by contacting the Beta zeolite with the first solvent or a second solvent to produce a Group II+, Group III or Group III+ base stock having a viscosity index greater than 120. The one or more high VI component of the first Group II base stock feed are absorbed by contacting the Beta zeolite with the first Group II base stock feed and the first solvent.

Further provided herein are systems for making a high quality isoparaffinic base stock comprising: an adsorption bed having a molecular sieve; a reservoir fluidically connected to the molecular sieve and comprising at least one hydrocarbon feedstock having a hydrocarbon feedstock viscosity index and one or more high VI components; a source of one or more solvents fluidically connected to the molecular sieve; and a solvent recovery system comprising a nanofiltration membrane for solvent recovery in fluidic communication with the molecular sieve. In the present systems, the molecular sieve has a ring size of 11 rings or high, a pore size equal to 5.9 Å or greater, and a crystal size of about 0.5 microns or less. In addition, in the present systems, the molecular sieve is contacted with a first solvent from the supply and/or the solvent recovery system to produce a first fraction base stock having a first fraction base stock viscosity index less than the hydrocarbon feedstock viscosity index. In the present systems, at least a portion of the one or more high VI components are adsorbed onto the molecular sieve. The molecular sieve is desorbed with the first solvent and/or a second solvent or combination thereof to produce a second fraction base stock having a second fraction base stock viscosity index greater than the hydrocarbon feedstock viscosity index. Also, the first solvent and/or the second solvent are recovered from the nanofiltration membrane of the present systems.

These and other features and attributes of the disclosed methods and systems and their advantageous applications and/or uses will be apparent from the detailed description of which follows.

BRIEF DESCRIPTION OF THE DRAWINGS

To assist those of ordinary skill in the relevant art in making and using the subject matter hereof, reference is made to the appended drawings, wherein.

DETAILED DESCRIPTION

Figure 1:
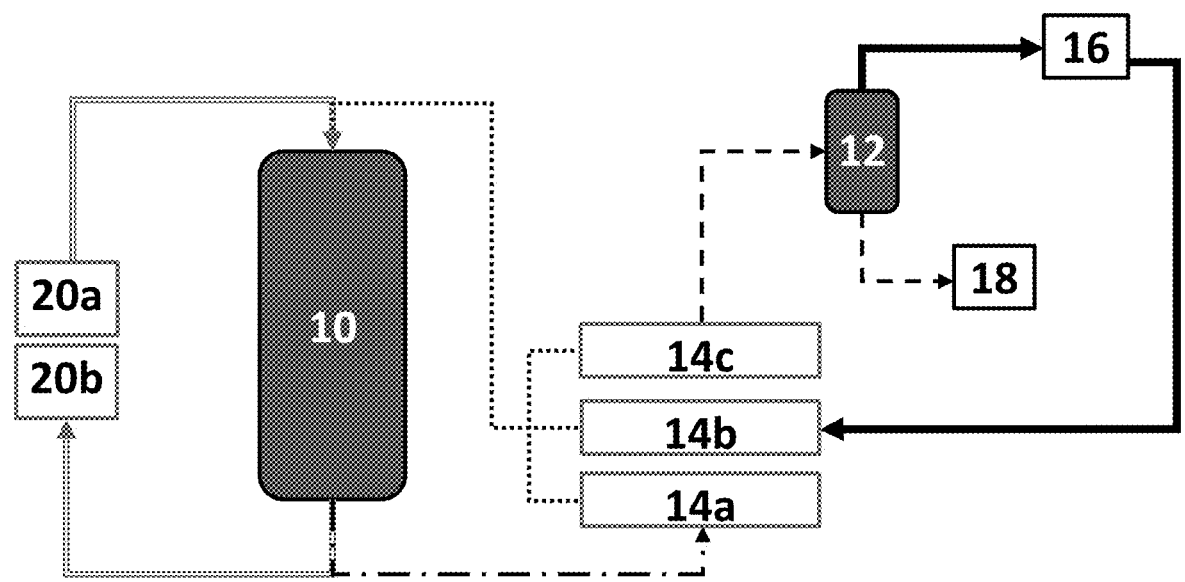
FIG. 1 is a simplified process scheme of the present methods and systems described herein.

Lubricating base stocks, which can be used to formulate engine lubricants and industrial oils, are normally prepared from suitable petroleum feedstocks (hydrocarbon feedstock) by a variety of refining processes. These refining processes are generally directed to obtaining base stock with a predetermined set of properties, for example, viscosity, oxidation stability and maintenance of fluidity over a wide range of temperature. The composition of the base stock can include organic hydrocarbons such as normal paraffins (i.e., n-paraffins), branched paraffins (i.e., iso-paraffins) and cyclic paraffins (i.e., naphthenes). The presence of paraffinic compounds within the base stock can affect the properties and quality of the lubricating oil. For example, high concentrations of normal paraffins can be undesirable, such as raising the pour point of the base stock.

Methods of making high quality of isoparaffinic lubricating oil base stock from lower quality lube oil (referred to herein as "base stock") by selective adsorption and desorption are presented herein. The present methods provide quality isoparaffinic lubricating oil/base stock from lower quality lube oil by selective adsorption and desorption. Specifically, the present methods can upgrade Group II (also II+) to Group III or Group III+ while coproducing base stock having a lower isoparaffin content.

Provided herein are methods of making a high quality isoparaffinic base stock comprising: providing a hydrocarbon feedstock having a hydrocarbon feedstock viscosity index comprising one or more high VI components; providing a first solvent; contacting an adsorbent material with the hydrocarbon feedstock and the first solvent; separating at least some of the one or more high VI components from the hydrocarbon feedstock to produce a first fraction base stock having a first fraction base stock viscosity index; contacting the adsorbent material with a second solvent; and desorbing the adsorbent material to produce a second fraction base stock having a second fraction base stock viscosity index. In these methods, the first fraction base stock viscosity index is less than the hydrocarbon feedstock viscosity index and the second fraction base stock viscosity index is greater than the hydrocarbon feedstock viscosity index.

In accordance with the various embodiment of the present methods, the method can include recovering the first solvent or the second solvent and/or a combination thereof to produce a recovered solvent. In an embodiment, the method further comprises contacting a nanofiltration membrane with the first fraction base stock and/or the second fraction base stock to recover the first solvent, the second solvent and/or a combination thereof and produce a recovered solvent. In an embodiment, the adsorbent material is contacted with the recovered solvent.

Also provided herein are methods of upgrading Group II base stock to Group II+, Group III or Group III+ base stock comprising adsorbing one or more high VI components of a first Group II base stock having a first Group II viscosity index with a Beta zeolite (also referred to herein as a "zeolite Beta") to provide a second Group II base stock with a viscosity index less than the first Group II base stock, and desorbing the Beta zeolite by contacting the Beta zeolite with the first solvent or a second solvent to produce a Group II+, Group III or Group III+ base stock having a viscosity index greater than 120. In this methodology, the one or more high VI component of the first Group II base stock are absorbed by contacting the Beta zeolite with the first Group II base stock and the first solvent to provide a second Group II base stock having a viscosity less than the first Group II base stock viscosity index.

In an embodiment of the methods provided herein, the high VI components comprise iso-paraffins and single-ring naphthenic molecules. In an embodiment, the step of separating the high VI components is performed at a temperature between about 20° C. to about 300° C. at a pressure between about 600 psi and about 1500 psi. In an embodiment, the step of desorbing the adsorbent material is performed at a temperature between about 50° C. to about 225° C. at a pressure between about 600 psi and about 1000 psi. In an embodiment, the boiling point of the first solvent and the second solvent are less than the boiling point of the hydrocarbon feedstock. In an embodiment, the first fraction base stock and the second fraction base stock comprise greater than or equal to 90% saturates. In an embodiment, the first fraction base stock and the second fraction base stock comprise 0.3 wt. % or less sulfur.

In accordance with the various embodiments of the invention, the first fraction base stock has a molecular weight between about 170 to about 1400. In an embodiment, the second fraction base stock has a molecular weight between about 170 to about 1400. In an embodiment, the difference between the first fraction base stock viscosity index and the hydrocarbon feedstock viscosity index is equal to or greater than 5 as measured by ASTM D 2270-74. In an embodiment, the difference between the second fraction base stock viscosity index and the hydrocarbon feedstock viscosity index is equal to or greater than 5 as measured by ASTM D 2270-74. In an embodiment, the difference between the first fraction base stock viscosity index and the second fraction base stock viscosity index is equal to or greater than 5 as measured by ASTM D 2270-74. In an embodiment, the first fraction base stock has a first fraction viscosity index of less than or equal to 120. In an embodiment, the second fraction base stock has a second fraction viscosity index of greater than 120. In an embodiment, one or more additional fractions are produced. Each additional fraction has an additional fraction viscosity index and each additional fraction viscosity index is equal to or greater than the second fraction base stock.

In accordance with the various embodiments of the invention, the adsorbent material is a molecular sieve. In an embodiment, the molecular sieve comprises a zeolite Beta. In an embodiment, the at least some of the one or more high VI components are adsorbed onto the molecular sieve. In an embodiment, the molecular sieve has a ring size of 11 T sites or greater, a pore size of 5.9 Å or greater, and a crystal size of about 0.5 microns or less.

Further provided herein are systems for making a high quality isoparaffinic base stock comprising: an adsorption bed having a molecular sieve; a reservoir fluidically connected to the molecular sieve and comprising at least one hydrocarbon feedstock having a hydrocarbon feedstock viscosity index and one or more high VI components; a source of one or more solvents fluidically connected to the molecular sieve; and a solvent recovery system comprising a nanofiltration membrane for solvent recovery in fluidic communication with the molecular sieve. In the present systems, the molecular sieve has a ring size of 11 T sites or high, a pore size less than 5.9 Å or greater, and a crystal size of about 0.5 microns or less. In addition, for desorption of the base stock, in the present systems, the molecular sieve is contacted with a first solvent from the supply and/or the solvent recovery system to produce a first fraction base stock having a first fraction base stock viscosity index less than the hydrocarbon feedstock viscosity index. At least a portion of the one or more high VI components are adsorbed onto the molecular sieve. The molecular sieve is desorbed with the first solvent and/or a second solvent or combination thereof to produce a second fraction base stock having a second fraction base stock viscosity index greater than the hydrocarbon feedstock viscosity index. Also, in the present systems, the first solvent and/or the second solvent are recovered from the nanofiltration membrane.

In accordance with the various embodiments of the invention, the present systems comprise a zeolite Beta adsorbent. In an embodiment, an organic solvent nanofiltration membrane are used for solvent recovery from a separated base stock product. In an embodiment, one or more distillation columns for stripping solvent from the first fraction base stock and/or second fraction base stock are provided. In an embodiment, the molecular sieve comprises zeolite Beta.

Hydrocarbon Feedstock

As used herein, a hydrocarbon feedstock is a liquid mixture of hydrocarbons. The hydrocarbon feedstock can contain: high-boiling hydrocarbons such as heavy oil fractions, vacuum distillate fractions derived from an atmospheric residue and/or distillate fractions obtained by vacuum distillation of a residual fraction which in return is obtained by atmospheric distillation of a crude oil; deasphalted atmospheric and vacuum residual oil fractions; hydrocrackate, waxy crudes, gas oils; one or more lube base stock; or mixtures of the same.

The boiling range of the hydrocarbon feedstock can vary. The hydrocarbon feedstock has a typical boiling range between 600° F. and 1500° F. ambient (at atmospheric pressure). To set the boiling point range for a hydrocarbon feedstock, an initial boiling point for a hydrocarbon feedstock and/or a final boiling point for a hydrocarbon feedstock can be used. Another option is to characterize a hydrocarbon feedstock based on the amount of the hydrocarbon feedstock that boils at one or more temperatures. For example, a "T5" boiling point/distillation point for a hydrocarbon feedstock is defined as the temperature at which 5 wt. % of the hydrocarbon feedstock will boil off. Similarly, a "T95" boiling point/distillation point is a temperature at which 95 wt. % of the hydrocarbon feedstock will boil. Boiling points, including fractional weight boiling points, can be determined using an appropriate ASTM test method, such as the procedures described in ASTM D2887, D2892, D6352, D7169 and/or D86.

Hydrocarbon feedstock as used in the various embodiments described herein include, for example, hydrocarbon feedstock having an initial boiling point or a T5 boiling point or T10 boiling point of at least 600° F. (~316° C.), or at least 650° F. (~343° C.), or at least 700° F. (~371° C.), or at least 750° F. (~399° C.). Additionally, or alternately, the final boiling point or T95 boiling point or T90 boiling point of the hydrocarbon feedstocks can be 1100° F. (~593° C.) or less, or 1050° F. (~566° C.) or less, or 1000° F. (~538° C.) or less, or 950° F. (~510° C.) or less. In particular, a hydrocarbon feedstock can have a T5 boiling point of at least 600° F. (~316° C.) and a T95 boiling point of 1100° F. (~593° C.) or less, or a T5 boiling point of at least 650° F. (~343° C.) and a T95 boiling point of 1050° F. (~566° C.) or less, or a T10 boiling point of at least 650° F. (~343° C.) and a T90 boiling point of 1050° F. (~566° C.) or less. It is possible, however, that the hydrocarbon feedstock has a lower boiling range portion. Such hydrocarbon feedstock can have an initial boiling point or a T5 boiling point or T10 boiling point of at least 350° F. (~177° C.), or at least 400° F. (~204° C.), or at least 450° F. (~232° C.). In particular, such a hydrocarbon feedstock can have a T5 boiling point of at least 350° F. (~177° C.) and a T95 boiling point of 1100° F. (~593° C.) or less, or a T5 boiling point of at least 450° F. (~232° C.) and a T95 boiling point of 1050° F. (~566° C.) or less, or a T10 boiling point of at least 350° F. (~177° C.) and T90 boiling point of 1050° F. (~566° C.) or less.

The hydrocarbon feedstock can contain aromatics and/or multi-ring molecules to be removed, a hydrotreated hydrocarbon stream (catalytically processed crude), and/or crude. For example, the hydrocarbon feedstock can be a waxy intermediate that has been hydrotreated and/or hydrorefined, a dewaxed hydrocarbon stream, and/or other hydrocarbon stream subject to a conversion process or hydroprocessing. The hydrocarbon feedstock has a carbon number in the range of C18 to C100+, and typically has a carbon number range between about C24 to C40.

In accordance to various embodiments, the hydrocarbon feedstock comprises an aromatic content of at least 20 wt. %, or at least 25 wt. %, or at least 30 wt. %, or at least 40 wt. %, or at least 50 wt. %, or at least 60 wt. %, such as up to 75 wt. % or up to 90 wt. %. In particular, the aromatics content can be 25 wt. % to 75 wt. %, or 25 wt. % to 90 wt. %, or 35 wt. % to 75 wt. %, or 35 wt. % to 90 wt. %. In other aspects, the hydrocarbon feedstock can have a lower aromatics content, such as an aromatics content of 35 wt. % or less, or 25 wt. % or less, such as down to 0 wt. %. In particular, the aromatics content can be 0 wt. % to 35 wt. %, or 0 wt. % to 25 wt. %, or 5.0 wt. % to 35 wt. %, or 5.0 wt. % to 25 wt. %. In an embodiment, the hydrocarbon feedstock has an aromatics content of about 25 wt. % to about 75 wt. %.

The hydrocarbon feedstock can have a sulfur content of 500 wppm to 20000 wppm or more, or 500 wppm to 10000 wppm, or 500 wppm to 5000 wppm. Additionally, or alternately, the nitrogen content of such a hydrocarbon feedstock can be 20 wppm to 4000 wppm, or 50 wppm to 2000 wppm. In some aspects, the hydrocarbon feedstock can correspond to a "sweet" hydrocarbon feedstock, so that the sulfur content of the hydrocarbon feedstock is 10 wppm to 500 wppm and/or the nitrogen content is 1 wppm to 100 wppm.

At least a portion of the hydrocarbon feedstock can comprise a hydrocarbon feedstock derived from a biocomponent source. The bicomponent refers to a hydrocarbon feedstock derived from a biological raw material component, from bicomponent sources such as vegetable, animal, fish, and/or algae. Vegetable fats/oils refer to any plant-based material, and can include fat/oils derived from a source such as plants of the genus Jatropha. The biocomponent sources can include vegetable fats/oils, animal fats/oils, fish oils, pyrolysis oils, and algae lipids/oils, as well as components of such materials, and in some embodiments can specifically include one or more type of lipid compounds. Th biological compound can be one or more lipid compounds that are insoluble in water, but soluble in non-polar (or fat) solvents. Non-limiting examples of such solvents include alcohols, ethers, chloroform, alkyl acetates, benzene, and combinations thereof.

The hydrocarbon feedstock can contain waxes that boil in the lubricating oil range typically having a 10% distillation point at 200° C. or higher, ranging to 600° C., as measured by ASTM D-2887-93. Examples of waxes having significant amounts of waxy compounds are synthetic waxy raffinates (Fischer-Tropsch waxy raffinates), hydrocracker bottom fractions (hydrowax), slack waxes obtained from the dewaxing of hydroprocessed or solvent refined waxy distillates. Wax content (primarily linear paraffins) of the feedstock can be as high as at least 50 wt. %, or at least 80 wt. %, or at least 90 wt. %. The amount of wax can be determined by ASTM D3235.

As described immediately below, in an aspect, the hydrocarbon feedstock can be a lube base stock. As used herein, the lube base stock is also referred to as a "base stock". The lube base stock can be a refined lubricant stock, or a blend where the lube feed stock is combined with another refined lubricant stock (lube base stock) having different properties.

Lube Base Stock

Lube base stock is a liquid mixture of hydrocarbons. The lube base stock can contain mixtures of high-boiling hydrocarbons, such as heavy oil fractions, vacuum distillate fractions derived from an atmospheric residue (distillate fractions obtained by vacuum distillation of a residual fraction which in return is obtained by atmospheric distillation of a crude oil), deasphalted residual oil fractions, including both deasphalted atmospheric residues and deasphalted vacuum residues, hydrocrackate, waxy crudes, gas oils, and/or lube base stocks.

The lube base stock can contain waxes that boil in the lubricating oil range typically having a 10% distillation point at 200° C. or higher, ranging to 600° C., as measured by ASTM D2887 or D7169. Examples of waxes having relatively high amounts of waxy compounds are synthetic waxy raffinates (Fischer-Tropsch waxy raffinates), hydrocracker bottom fractions (hydrowax), i.e., fractions having a final boiling point of at least 320° C., at least 340° C., or at least 360° C. and slack waxes obtained from the dewaxing of hydroprocessed or solvent refined waxy distillates. These waxes have a wax content of at least 50 wt. %, or at least 80 wt. %, or at least 90 wt. %. The amount of wax can be determined by ASTM D3235. Waxy molecules include linear paraffins.

The lube base stock can be a refined lubricant stock used by itself, or it can be blended with another refined lubricant stock having different properties. Prior to use the lube base stock can be compounded with one or more additives which function, for example, as antioxidants, extreme pressure additives and/or VI improvers. The lube base stock additionally contains waxy components which are n- or iso-paraffins, and the majority of the lube base stock can be expected to have a boiling point above 250° C.

If the lube base stock contains sulfur and/or nitrogen contaminants, for example, with the amount of sulfur up to 3 wt. % and the amount of nitrogen up to 1 wt. %, it can be advantageous to subject the lube base stock to catalytic hydrodesulfurization or catalytic de-nitrogenation prior to the separation process of the present methodologies. Furthermore, the lube base stock can have been hydrotreated and/or hydrocracked before being subjected to separation.

Lube base stocks are distinguished by viscosity and are produced to certain viscosity specifications. Since viscosity is approximately related to molecular weight, the first step in manufacturing a base stock is to separate out lube precursor molecules of feedstock having the correct molecular weight range by distillation in a crude fractionation system. Lower-boiling fuel products of low viscosities and volatilities that have no application in lubricants are distilled off. Therefore, higher molecular weight hydrocarbon feedstocks (which do not vaporize at atmospheric pressure) can be fractionated by distillation at reduced pressure between about 10 mmHg to about 50 mmHg. The higher molecular weight hydrocarbon feedstock is then fed to a vacuum tower where intermediate product streams such as light vacuum gas oil ("LVGO") and heavy vacuum gas oil ("HVGO") are produced. These intermediate product streams can be narrow cuts of specific viscosities destined for a solvent refining step, or they can be broader cuts destined for hydrocracking to lubes and fuels.

As used herein, the lube base stock can have a kinematic viscosity at 100° C. of about 1.5 cSt to about 35 cSt, or 1.5 cSt to 30 cSt, or 1.5 cSt to 25 cSt, or 1.5 cSt to 20 cSt, or 1.5 cSt to 16 cSt, or 1.5 cSt to 12 cSt, or 1.5 cSt to 10 cSt, or 1.5 cSt to 8 cSt, or 1.5 cSt to 6 cSt, or 1.5 cSt to 5 cSt, or 1.5 cSt to 4 cSt, or 2.0 cSt to 35 cSt, or 2.0 cSt to 30 cSt, or 2.0 cSt to 25 cSt, or 2.0 cSt to 20 cSt, or 2.0 cSt to 16 cSt, or 2.0 cSt to 12 cSt, or 2.0 cSt to 10 cSt, or 2.0 cSt to 8 cSt, or 2.0 cSt to 6 cSt, or 2.0 cSt to 5 cSt, or 2.0 cSt to 4 cSt, or 2.5 cSt to 35 cSt, or 2.5 cSt to 30 cSt, or 2.5 cSt to 25 cSt, or 2.5 cSt to 20 cSt, or 2.5 cSt to 16 cSt, or 2.5 cSt to 12 cSt, or 2.5 cSt to 10 cSt, or 2.5 cSt to 8 cSt, or 2.5 cSt to 6 cSt, or 2.5 cSt to 5 cSt, or 2.5 cSt to 4 cSt, or 3.0 cSt to 35 cSt, or 3.0 cSt to 30 cSt, or 3.0 cSt to 25 cSt, or 3.0 cSt to 20 cSt, or 3.0 cSt to 16 cSt, or 3.0 cSt to 12 cSt, or 3.0 cSt to 10 cSt, or 3.0 cSt to 8 cSt, or 3.0 cSt to 6 cSt, or 3.5 cSt to 35 cSt, or 3.5 cSt to 30 cSt, or 3.5 cSt to 25 cSt, or 3.5 cSt to 20 cSt, or 3.5 cSt to 16 cSt, or 3.5 cSt to 12 cSt, or 3.5 cSt to 10 cSt, or 3.5 cSt to 8 cSt, or 3.5 cSt to 6 cSt.

Additionally, or alternatively, the lube base stock can have a viscosity index of about 50 to about 120, or 60 to 120, or 70 to 120, or 80 to 120, or 90 to 120, or 100 to 120, or 50 to 110, or 60 to 110, or 70 to 110, or 80 to 110, or 90 to 110, or 50 to 100, or 60 to 100, or 70 to 100, or 80 to 100, or 50 to 90, or 60 to 90, or 70 to 90, or 50 to 80, or 60 to 80.

As an alternative to characterizing the lube base stock based on viscosity index, a lube base stock can be characterized based on the paraffin content of the feed. In such aspects, a lube base stock for forming a high viscosity base stock can have a paraffin content of at least about 30 wt. %, or at least about 35 wt. %.

Additionally, or alternatively, the lube base stock can have a density at 15.6° C. of about 0.91 g/cm$^3$ or less, or about 0.90 g/cm$^3$ or less, or about 0.89 g/cm$^3$ or less, or about 0.88 g/cm$^3$, or about 0.87 g/cm$^3$, such as down to about 0.84 g/cm$^3$ or lower.

The molecular weight of the lube base stock can be characterized based on number average molecular weight (corresponding to the typical average weight calculation), and/or based on mass or weight average molecular weight, where the sum of the squares of the molecular weights is divided by the sum of the molecular weights, and/or based on polydispersity, which is the weight average molecular weight divided by the number average molecular weight.

The number average molecular weight Mn of a feed can be mathematically expressed as $$M_n = \frac{\Sigma_i N_i M_i}{\Sigma_i N_i} \quad (1)$$

In Equation (1), Ni is the number of molecules having a molecular weight Mi. The weight average molecular weight, Mw, gives a larger weighting to heavier molecules. The weight average molecular weight can be mathematically expressed as $$M_w = \frac{\Sigma_i N_i M_i^2}{\Sigma_i N_i M_i} \quad (2)$$

The polydispersity can then be expressed as Mw/Mn. In various aspects, the lube base stock can have a polydispersity of 1.30 or less, or 1.25 or less, or 1.20 or less, and/or at least about 1.0. Additionally, or alternatively, the lube base stock can have a number average molecular weight (Mn) of 300 to 1000 g/mol. Additionally, or alternatively, the lube base stock can have a weight average molecular weight (Mw) of 500 to 1200 g/mol.

As described herein, the lube base stock comprises a hydrocarbon feedstock that is any one or more of a wide variety of petroleum and chemical feedstocks. In accordance with various embodiments of the invention, and by way of example, hydrocarbon feedstocks can be whole and reduced petroleum crudes, atmospheric, cycle oils, gas oils, including vacuum gas oils and coker gas oils, light to heavy distillates including raw virgin distillates, hydrocrackates, hydrotreated oils, petroleum-derived waxes (including slack waxes), Fischer-Tropsch waxes, raffinates, deasphalted oils and mixtures of these materials. Hydrocarbon feedstocks also include deasphalted oil (DAO), vacuum gas oil (VGO), vacuum distillates, intermediate streams, or combinations thereof.

In accordance with various embodiments of the invention, the lube base stock (hydrocarbon feedstock stream) can be VGO/distillate straight from a 'fuels' based atmospheric/vacuum distillation tower. VGO/distillate from a 'lubes' based vacuum distillation tower, hydroprocessed VGO/distillate/DAO. In some embodiments, the hydrocarbon feedstock is a stream of Group II or III base stock.

Lube base stocks can contain between 2-20% being additives to improve performance. The lube base stock has a typical boiling range between 600° F. and 1100° F. at atmospheric pressure. The lube base stock can be produced from a vacuum gas oil fraction and residue (a high-boiling region) of crude oil and boiling ranges of the lube base stock can vary. Base stocks are grouped via a sulfur, saturate, and viscosity index criteria and are frequently characterized by their density, kinematic viscosity at 40° C. and 100° C., pour point, and cloud point.

Lube base stocks are typically a fluid at the operating temperature of the lubricant and used to formulate a lubricant by admixing with other components. As described herein, non-limiting examples of base stocks suitable in lubricants include API Group I, Group II, Group III, Group IV, and Group V base stocks.

Lube base stocks are generally classified into two broad types—naphthenic and paraffinic—depending on the crude types they are derived from. Naphthenic crudes are characterized by the absence of wax or have very low levels of wax. Therefore, naphthenic crudes are largely cycloparaffinic and aromatic in composition. Furthermore, naphthenic lube fractions without any dewaxing are generally liquid at low temperatures. On the other hand, paraffinic crudes contain cycloparaffins, aromatics and wax; wax being largely n- and iso-paraffins which have high melting points.

The lube base stock can be a natural oil or a combination of natural oils. Natural oils (or mixtures thereof) can be used unrefined, refined, or re-refined (the latter is also known as reclaimed or reprocessed oil). Unrefined oils are those obtained directly from a natural source and used without added purification. These include shale oil obtained directly from retorting operations, petroleum oil obtained directly from primary distillation, and ester oil obtained directly from an esterification process. Refined oils are similar to unrefined oils except refined oils are subjected to one or more purification steps to improve the at least one lubricating oil property.

To produce the lube base stock, in accordance with the various embodiments of the invention, process steps can include solvent extraction, secondary distillation, acid extraction, base extraction, filtration, percolation, oligomerization and dimerizations of olefins including poly alpha olefins, poly internal olefins and bio-derived base stocks. Re-refined oils are obtained by processes analogous to refined oils but using an oil that has been previously used as a feedstock. Natural oils vary as to the method used for their production and purification, for example, their distillation range and whether they are straight run or cracked, hydrorefined, or solvent extracted. Feedstock can also include used oils, pretreated oils and other recycled materials.

Also, natural oils can include animal oils, vegetable oils (castor oil and lard oil, for example), and mineral oils. Animal and vegetable oils possessing favorable thermal oxidative stability can be used. Of the natural oils, mineral oils can vary widely as to their crude source, for example, as to whether they are paraffinic, naphthenic, or mixed paraffinic-naphthenic.

Groups I, II, III, IV and V are broad categories of base stocks. See e.g., API Publication 1509. Group I base stocks generally have a viscosity index of from 80 to 120 and contain greater than 0.03% sulfur and less than 90% saturates. Group II base stocks generally have a viscosity index of from 80 to 120 and contain less than or equal to 0.03% sulfur and greater than or equal to 90% saturates. Group III base stocks generally have a viscosity index greater than 120 and contains less than or equal to 0.03% sulfur and greater than 90% saturates. Group IV base stocks include polyalphaolefins. Group V base stocks include base stocks not included in Groups I-IV. Table 1 below summarizes properties of each of these five groups.

TABLE 1

| Lube Base Stock Properties | | | |
|---|---|---|---|
| | Saturates | Sulfur | Viscosity Index |
| Group I | <90 and/or | >0.03% and | ≥80 and <120 |
| Group II | ≥90 and | ≤0.03% and | ≥80 and <120 |
| Group III | ≥90 and | ≤0.03% and | ≥120 |
| Group IV | Includes PAO products | | |
| Group V | All other base stocks not included in Groups I, II, III, or IV | | |

Group II and/or Group III base stocks are hydroprocessed and/or hydrocracked base stocks. According to various embodiments, the base stock is a Group II or a Group II base stock or a blend of base stocks, including for example, without limitation, multiple Group II and/or Group III base stocks. According to various embodiments of the present invention, a Group II and/or Group III base stock can be used in combination with a synthetic oil. Synthetic oils include hydrocarbon oil such as polymerized and interpolymerized olefins such as polybutylenes, polypropylenes, propylene isobutylene copolymers, ethylene-olefin copolymers, and ethylene-alpha-olefin copolymers, for example. Polyalpha-olefin oil base stocks, the Group IV API base stocks, can be used as base stock. By way of example, PAOs derived from $C_8$, $C_{10}$, $C_{12}$, $C_{14}$ olefins or mixtures thereof can be utilized. See U.S. Pat. Nos. 4,956,122; 4,827,064; and 4,827,073. Group IV hydrocarbons and base stocks have viscosity indices greater than about 130, greater than about 135, and greater than about 140.

Examples of Group II base stocks can be EHC-45 (VI of 113-119, KV40 of 4.4-4.7 cSt, NOAK of 15 wt. %), 100R (VI of 117, KV40 of 4.4 cSt, NOAK of 16 wt. %), aramcoPRIMA 100 (VI of 105, KV40 of 4.17 cSt, NOAK of 23 wt. %), aramcoPRIMA 110 (VI of 113, KV40 of 4.6 cSt, NOAK of 14 wt. %). Examples of the Group III base stock are armacoULTRA (VI of 124, KV40 of 4.27 cSt, NOAK of 14.7 wt. %), Yubase4 (VI of 122, KV40 of 4.23 cSt, NOAK of 15 wt. %), NEXBASE 3043 (VI of 123, KV40 of 4.3 cSt, NOAK of 14.4 wt. %.

As described herein, the lube feed stock can comprise one or more base stocks. The base stock can have a kinematic viscosity at 100° C. ("KV100"), measured according to ASTM standard D-445, from about 4.0 cSt to about 7.0 cSt, about 5.0 cSt to about 6.0 cSt. Base stocks can have a kinematic viscosity at 40° C. ("KV40"), measured according to ASTM standard D-445, from about 18 cSt to about 42 cSt and from about 15 cSt to about 40 cSt. The base stocks have a viscosity index, calculated according to ASTM standard D-2270, from about 80 to about 150 and from about 105 to about 142.

Base stocks can have a NOACK volatility of no greater than about 35%, no greater than about 30%, and/or no greater than about 25%. Base stock can have a Noack volatility of between about 7.0 wt. % to about 15.0 wt. %. As used herein, Noack volatility is determined by ASTM D-5800.

Additionally, or alternatively, the base stocks can have a pour point of less than about −20° C., less than about −40° C., less than about −50° C., less than about −60° C. Also, the base stocks can have a pour point of between about −15° C. and −60° C.

As described above, the hydrocarbon feedstock has hydrocarbons in the lubricant (lube) range. For example, the hydrocarbon feedstock can include hydrocarbons having equal to or greater than about 12 carbon atoms. Particularly, and not by way of limitation, the hydrocarbon feed stock can include paraffins having from 12 to 100 carbon atoms, or 12 to 40 carbon atoms. The hydrocarbon feedstock for use in the presently disclosed subject matter can be derived from any one of a variety of sources including crude oil and/or petroleum, or other suitable source, e.g., synthetic oils, Fischer-Tropsch oils, shale oils and/or blends thereof.

The hydrocarbon feedstock can include normal paraffins (i.e., n-paraffins), branched paraffins (i.e., iso-paraffins), cyclic paraffins (i.e., naphthenes) or combinations thereof. For example, and not by way of limitation, the hydrocarbon feedstock can include up to about 95% n-paraffins. Non-limiting examples of n-paraffins that can be present in the hydrocarbon feedstock can include eicosane ($C_{20}H_{42}$), henicosane ($C_{21}H_{44}$), docosane ($C_{22}H_{46}$), tricosane ($C_{23}H_{48}$), tetracosane ($C_{24}H_{50}$), pentacosane ($C_{25}H_{52}$), triacontane ($C_{30}H_{62}$), dotriacontane ($C_{32}H_{66}$), pentatriacontane ($C_{35}H_{72}$), and tetracontane ($C_{40}H_{82}$). Additionally, or alternatively, the hydrocarbon feedstock can comprise less than or equal to 50 wt. % iso-paraffins. Non-limiting examples of iso-paraffins that can be present in the hydrocarbon feedstock can include 2-methylhexadecane ($C_{17}H_{36}$), 7-methylhexadecane ($C_{17}H_{36}$), pristane ($C_{19}H_{46}$) and squalane ($C_{36}H_{62}$). Furthermore, the hydrocarbon feedstock can include up to about 100% naphthenes. Non-limiting examples of naphthenes that can be present in the hydrocarbon feedstock can include, but are not limited to, n-octadecyl-c-hexane ($C_{24}H_{48}$) and cholestane ($C_{27}H_{48}$).

The present methods include the step of contacting the hydrocarbon feedstock with an adsorbent to adsorb high VI components from a hydrocarbon feedstock. The hydrocarbon feedstock can be contacted with the adsorbent under conditions that adsorb the high VI components from the hydrocarbon feedstock to result in a first flow through (i.e., a first eluate) that includes iso-paraffins and naphthenes, e.g., one ring and/or multi-ring naphthenes. For example, and not by way of limitation, the adsorbent can retain up to about 85% of the n-paraffins initially present in the hydrocarbon feedstock.

Contacting the hydrocarbon feedstock with an adsorbent can be performed using a variety of known techniques. For example, the hydrocarbon feedstock can contact a bed of a one or more adsorbents in a down flow direction (e.g., flow directed by gravity). In non-limiting embodiments, the adsorbent can be present in one or more columns and the hydrocarbon feedstock can be applied to a column containing the one or more adsorbents. The adsorbent can be in the form of pallets in the randomly packed bed or structured packed bed or a monolith form. The adsorbent can be in a rotary wheel (moving bed) or true moving bed.

As described herein, the adsorbent used in the present methods and systems can include a zeolite adsorbent. Zeolites are classified by the Structure Commission of the International Zeolite Association according to the rules of the IUPAC Commission on Zeolite Nomenclature. A framework-type describes the topology and connectivity of the tetrahedrally-coordinated atoms constituting the framework and makes an abstraction of the specific properties for those materials. Zeolites can possess an internal pore system that includes interconnected cagelike voids or a system of one-, two- or three-dimensional channels. Zeolite adsorbents for which a structure has been established are assigned a three-letter code and are described in the Atlas of Zeolite Framework Types, 5$^{th}$ edition, Elsevier, London, England (2001), which is incorporated in its entirety by reference herein. Zeolites can selectively adsorb molecules based upon differences in molecular size, shape and other properties such as polarity. In an embodiment, the adsorbent includes a zeolite with a pore diameter from at least about 5.5 angstroms (Å) or greater, or greater than about 5.9 Å. For example, and not by way of limitation, the first adsorbent can have a pore diameter from about 5.5 Å to about 20 Å.

In accordance with the various embodiments of the invention, the adsorbent can be a zeolite having a framework type of BEA or MTT. For example, and not by way of limitation, the adsorbent can be selected from ZSM-5, ZSM-11, ZSM-12, ZSM-22, ZSM-23, ZSM-35, ZSM-48, ZSM-50, ZSM-57 or combinations thereof. In non-limiting embodiments, the zeolite can include ZSM-23. The ZSM-23 adsorbent can be used to adsorb n-paraffins, e.g., eicosane from the hydrocarbon feedstock, to result in a flow through, i.e., a first eluate, that contains iso-paraffins and naphthenes. A non-limiting example of a ZSM-23 adsorbent, including synthesis details, is described in, for example, U.S. Pat. No. 4,076,842, which is hereby incorporated by reference in its entirety. It is contemplated that the zeolites may be extruded (bound) with alumina. It is also contemplated that the zeolite used could be pure or with other inert diluents, but it would need to be formed to a sufficient particle size that permits flow without excessive pressure drop within a column.

In an embodiment, the zeolite of the adsorbent can include zeolite Beta. Zeolite Beta adsorbent can be used to adsorb linear and iso-paraffins, e.g., 7-methylhexadecane, and one-ring naphthenes, e.g., n-octadecyl-cyclo-hexane, from the first flow through, to result in a second flow through that contains multi-ring naphthenes. Zeolite Beta adsorbents, including synthesis details, are described in, for example, EP Patent Application No. EP0187522 and U.S. Pat. No. 6,207,604. As embodied herein, the zeolite Beta was used after extruding it with an alumina binder.

As provided herein, the absorbent can be in any form. For example, and not by way of limitation, a zeolite can be used in the form of beaded particles, crushed particles or extruded particles. The zeolite can be used alone, or in association with known binders including, but not limited to, silica, alumina, aluminosilicates, titania, zirconia, or clays such as kaolin and attapulgite. In accordance with another aspect of the disclosed subject matter, the methods disclosed herein can further include analyzing and quantifying the purified fractions. For example, and not by way of limitation, the fractions generated by the disclosed method can be further analyzed by gas chromatography, gas chromatography-mass spectrometry, nuclear magnetic resonance and/or 2D-gas chromatography for quantification of the n-paraffins, iso-paraffins, one-ring and multi-ring naphthenes that were present in the hydrocarbon feedstock.

In the present methods, the hydrocarbon feedstock contacts the adsorbent in the presence of one or more solvents, e.g., a non-polar solvent. For example, and not by way of limitation, the solvent can contact the adsorbent prior to and/or after the contact of the hydrocarbon feedstock with the adsorbent. Alternatively, the hydrocarbon feedstock contacts the adsorbent concomitantly with the solvent. Non-limiting examples of solvents include hexane, iso-hexane, heptane, iso-heptane, octane, iso-octane or combinations thereof. For example, the solvent can include iso-octane. In an embodiment, the solvent can include heptane and iso-octane at an amount of about 10% heptane in iso-octane. The solvent can be any hydrocarbon stream consisting of naphtha, kerosene, diesel or any narrow boiling cut of them or any wide boiling mixture of them. The solvent can be liquid ammonia, $CO_2$, ethane, propane, butane, iso-butane or any mixture of them.

The solvent to hydrocarbon feedstock ratio required to achieve separation of the paraffin, isoparaffin and naphthene is between about 1 unit to about 50 unit, about 1 unit to about 20 unit or about 1 unit to about 2 unit. The first solvent and/or the second solvent can be a mixture of paraffin, isoparaffin, naphthene, and aromatics and include one or more lower paraffins and/or higher paraffin, collectively referred to as "paraffin" together with or without naphtha, kerosene and the like. A "lower paraffin," includes a paraffin that has one to eight carbon atoms. A "higher paraffin" includes a paraffin that has nine or more carbon atoms. The first solvent and/or the second solvent can comprise between about 10 to 100 wt. % of paraffin. The first solvent and/or the second solvent has a boiling point less than about 300° C. The first solvent and/or the second solvent can be a non-hydrocarbon molecule such as $CO_2$ and $NH_3$.

The present methods can include contacting a flow through of the adsorbent, i.e., a first flow through a first absorbent (first eluate) to a second adsorbent. Application of the first flow through to the second adsorbent can be used to adsorb iso-paraffins, e.g., pristane, and one-ring naphthenes from the first flow through, to result in a second flow through (i.e., second eluate) that contains multi-ring naphthenes, e.g., a multi-ring naphthene fraction. In the context of when more than one absorbent is utilized, the first flow through can contact the second adsorbent material in the presence of the first solvent or the second solvent.

The Present Systems

As described herein, the present methods can utilize one or more adsorption beds, filled with a suitable adsorbent or adsorbents, and a solvent recovery system that can separate solvents used from the separated lubricating oil (base stock) products. FIG. 1 shows an exemplary system for making high quality isoparaffinic base stock 18 that can utilize the present methodologies. As shown in FIG. 1, an adsorption bed 10 can consist of a single column or multiple columns (not shown). The columns (not shown) can be configured as a simulated moving bed. In an embodiment, the columns (not shown) can be configured as cyclic swing beds. In an embodiment, zeolite is the adsorbent that selectively adsorbs high VI components in the hydrocarbon feedstock. The adsorbent (not shown) can be formed and sized with a suitable binder such as silica or alumina to control pressure drop and mass transfer characteristics.

In accordance with the various embodiments of the invention, the hydrocarbon feedstock containing a substantial fraction of high viscosity index components (also referred to herein as "high VI components" or "120 VI components" or "greater than about 120 VI") is fed to the adsorption bed along with a suitable amount of solvent to carry out the separation. As described herein, Group II (or Group II+), and Group III lubricating base oils are exemplary hydrocarbon feedstocks 20a, 20b. As shown in FIG. 1, solvent can be recovered from separated base stock by distillation 12, and returned to the adsorption bed 10. Solvent recovery methods include nanofiltration, fractionation, steam stripping and nitrogen stripping. In an embodiment, one or more organic solvent nanofiltration membranes 14a, 14b, 14c are utilized for solvent recovery from separated base stock and prior to the final distillation, the "stripping" step. Recovered solvent 16 is returned to the adsorption process.

One solvent or a combination of solvents can be used to elute the adsorbed greater than 120 VI components from the adsorption bed 10. In an embodiment, the solvent is a low boiling naphtha. Components in the low boiling naphtha can include n-paraffins, such as n-hexane, n-heptane, n-octane, up to n-dodecane. Non-absorbing or weakly adsorbing solvents can be used to facilitate recovery of the base stock. In an embodiment, solvent can include highly branched paraffins in the naphtha boiling range. Components such as isooctane 2,2,4-trimethylpentane can flush a lower VI base stock fraction from the column(s). Solvents can recover the lower VI base stock product from the absorption bed 10 so as to obtain maximum VI by minimizing contamination when desorbing the higher VI components.

In an embodiment, the adsorption of high VI components from the hydrocarbon feedstock is conducted at the lowest possible temperatures to maximize adsorbent capacity at the same time higher temperature is necessary to make adsorption happen faster. Temperatures from ambient or about 20° C. to about 300° C. are suitable or about 100° C. to about 200° C. Low temperature adsorptions are facilitated by the low pour point of the isoparaffinic base oils. Desorption is facilitated by higher n-paraffinic solvent temperatures. Temperatures from about 50° C. to about 300° C. are suitable or about 100° C. to about 200° C.

ADDITIONAL EMBODIMENTS

Embodiment 1. A method of making a high quality isoparaffinic base stock comprising the steps of: providing a hydrocarbon feedstock having a hydrocarbon feedstock viscosity index comprising one or more high VI components; providing a first solvent; contacting an adsorbent material with the hydrocarbon feedstock and the first solvent; separating at least some of the one or more high VI components from the hydrocarbon feedstock to produce a first fraction base stock having a first fraction base stock viscosity index; contacting the adsorbent material with a second solvent; and desorbing the adsorbent material to produce a second fraction base stock having a second fraction base stock viscosity index, wherein the first fraction base stock viscosity index is less than the hydrocarbon feedstock viscosity index and the second fraction base stock viscosity index is greater than the hydrocarbon feedstock viscosity index.

Embodiment 2. The method of Embodiment 1, wherein the first fraction base stock has a molecular weight (Mw) between 170 to 1400.

Embodiment 3. The method of Embodiment 1, wherein the second fraction base stock has a molecular weight (Mw) between 170 to 1400.

Embodiment 4. The method of Embodiments 1, 2, and 3, wherein the difference between the first fraction base stock viscosity index and the hydrocarbon feedstock viscosity index is equal to or greater than 5 as measured by ASTM D 2270-74.

Embodiment 5. The method of Embodiments 1, 2, and 3, wherein the difference between the second fraction base stock viscosity index and the hydrocarbon feedstock viscosity index is equal to or greater than 5 as measured by ASTM D 2270-74.

Embodiment 6. The method of Embodiments 1, 2, and 3, wherein the difference between the first fraction base stock viscosity index and the second fraction base stock viscosity index is equal to or greater than 5 as measured by ASTM D 2270-74.

Embodiment 7. The method of Embodiment 1, wherein the first fraction base stock has a first fraction viscosity index of less than or equal to 120.

Embodiment 8. The method of Embodiment 1, wherein the second fraction base stock has a second fraction viscosity index of greater than 120.

Embodiments 9. The method of Embodiment 1, wherein one or more additional fractions are produced, wherein each additional fraction has an additional fraction viscosity index and each additional fraction viscosity index is equal to or greater than the second fraction base stock.

Embodiments 10. The method of Embodiment 1, wherein the adsorbent material is a molecular sieve.

Embodiment 11. The method of Embodiment 10, wherein the molecular sieve comprises a zeolite Beta.

Embodiment 12. The method of Embodiment 10, wherein the at least some of the one or more high VI components are adsorbed onto the molecular sieve.

Embodiment 13. The method of Embodiment 10, wherein the molecular sieve has a ring size of 11 rings or greater, a pore size of 5.9 Å or greater, and a crystal size of 0.5 microns or less Embodiment 14. The method of Embodiment 1, further comprising the step of recovering the first solvent or the second solvent and/or a combination thereof to produce a recovered solvent.

Embodiment 15. The method of Embodiment 1, further comprising the step of contacting a nanofiltration membrane with the first fraction base stock and/or the second fraction base stock to recover the first solvent, the second solvent and/or a combination thereof and produce a recovered solvent.

Embodiment 16. The method of any one of the preceding Embodiments, wherein the adsorbent material is contacted with the recovered solvent.

Embodiment 17. A method of upgrading Group II base stock to Group II+, Group III or Group III+ base stock comprising the steps of: adsorbing one or more high VI components of a first Group II base stock having a first Group II viscosity index with a Beta zeolite, wherein the first Group II base stock and a first solvent contact the Beta zeolite to provide a second Group II base stock having a viscosity index less than the first Group II base stock viscosity index; and desorbing the Beta zeolite, wherein the Beta zeolite is contacted with the first solvent or a second solvent to produce a Group II+, Group III or Group III+ base stock having a viscosity index greater than 120.

Embodiment 18. The method of Embodiment 17, further comprising the step of recovering the first solvent and/or the second solvent from the second Group II base stock, the Group II+ base stock, the Group III base stock and/or Group III+ base stock.

Embodiment 19. The method of any one of the preceding Embodiments, wherein the high VI components comprise iso-paraffins and single-ring naphthenic molecules.

Embodiment 20. The method of any one of the preceding Embodiments, wherein the step of separating the high VI components is performed at a temperature between 20° C. to 300° C. at a pressure between 600 psi and 1500 psi.

Embodiment 21. The method of any one of the preceding Embodiments, wherein the step of desorbing the adsorbent material is performed at a temperature between 50° C. to 225° C. at a pressure between 600 psi and 1000 psi.

Embodiment 22. The method of any one of the preceding Embodiments, wherein the boiling point of the first solvent and the second solvent are less than the boiling point of the feedstock.

Embodiment 23. The method of any one of the preceding Embodiments, wherein the first fraction base stock and the second fraction base stock comprise greater than or equal to 90% saturates.

Embodiment 24. The method of any one of the preceding Embodiments, wherein the first fraction base stock and the second fraction base stock comprise 0.3 wt. % or less sulfur.

Embodiment 25. The method of any one of the preceding Embodiments, wherein the first fraction base stock and/or the second fraction base stock have a carbon number of C12 to C100.

Embodiment 26. The method of any one of the preceding Embodiments, further comprising removing the first solvent and/or the second solvent from the first fraction base stock and/or the second fraction base stock prior to measuring the first fraction base stock viscosity index and/or the second fraction base stock viscosity index.

Embodiment 27. A system for making a high quality isoparaffinic base stock comprising: an adsorption bed comprising a molecular sieve, wherein the molecular sieve has a ring size of 11 rings or high, a pore size less than 5.9 Å or greater, and a crystal size of 0.5 microns or less; a reservoir comprising at least one hydrocarbon feedstock fluidically connected to the molecular sieve, wherein the hydrocarbon feedstock has a hydrocarbon feedstock viscosity index and one or more high VI components; a source of one or more solvents fluidically connected to the molecular sieve; and a solvent recovery system in fluidic communication with the molecular sieve and comprises a nanofiltration membrane for solvent recovery, wherein the molecular sieve is contacted with a first solvent from the supply and/or the solvent recovery system to produce a first fraction base stock having a first fraction base stock viscosity index less than the hydrocarbon feedstock viscosity index wherein at least a portion of the one or more high VI components are adsorbed onto the molecular sieve, and the molecular sieve is desorbed with the first solvent and/or a second solvent or combination thereof to produce a second fraction base stock, the second fraction base stock having a second fraction base stock viscosity index greater than the hydrocarbon feedstock viscosity index, and the first solvent and/or the second solvent are recovered from the nanofiltration membrane.

Embodiment 28. The system of Embodiment 27, further comprising one or more distillation columns for stripping solvent from the first fraction base stock and/or second fraction base stock.

Embodiment 29. The system of Embodiment 27, wherein the molecular sieve comprises zeolite Beta.

Additional features of the present methodologies are described in the following non-limiting examples.

Example 1

A hydrocarbon feedstock was prepared by blending readily available components. The hydrocarbon feedstock comprised 46.6 wt. % cholestane, 48.7 wt. % squalane (SQU), and about 4.7 wt. % n-octacosane (nC28), all of which are in the lube carbon range molecules. Cholestane (CHO) is $C_{27}H_{48}$ tetracyclic, triterpene purchased from Sigma-Aldrich. Squalane is a $C_{30}H_{62}$ multibranched isoparaffin (2,6,10,15,19,23-hexamethyltetracosane) with 6 methyl groups on a $C_{24}$ paraffinic chain obtained from Sigma-Aldrich. N-octacosane is $C_{28}H_{58}$ n-paraffin.

To facilitate handling, this model oil blend was dissolved in Isooctane (2,2,4-trimethylpentane, Sigma Aldrich HPLC Grade) at a concentration of about 21 wt. %.

An adsorption column of zeolite Beta was used for separating the hydrocarbon feedstock. A 250 mm×4.6 mm ID column was packed with 2.13 g after sizing 100-200 mesh particles of a zeolite Beta containing hydroisomerization catalyst. The catalyst/adsorbent contained 65% by weight acidic zeolite Beta in an alumina binder incorporated with 0.5% platinum. The column was dried for 2 hours in flowing nitrogen at 150° C. before use. The catalyst was inactive for hydroisomerization at the conditions used.

Separation of the hydrocarbon feedstock was achieved by introducing a 0.4 ml pulse of the model hydrocarbon feedstock into the column with n-heptane (Sigma Aldrich HPLC Grade) as solvent with flow rate at 0.4 ml/min, at a pressure of 60 bar and a temperature of 150° C. Samples of the effluent were collected at 1 min intervals and analyzed by gas chromatography with a flame ionization detector (GC-FID). The results were used to reconstruct the separation of all components and the solvent quantitatively.

Figure 2:
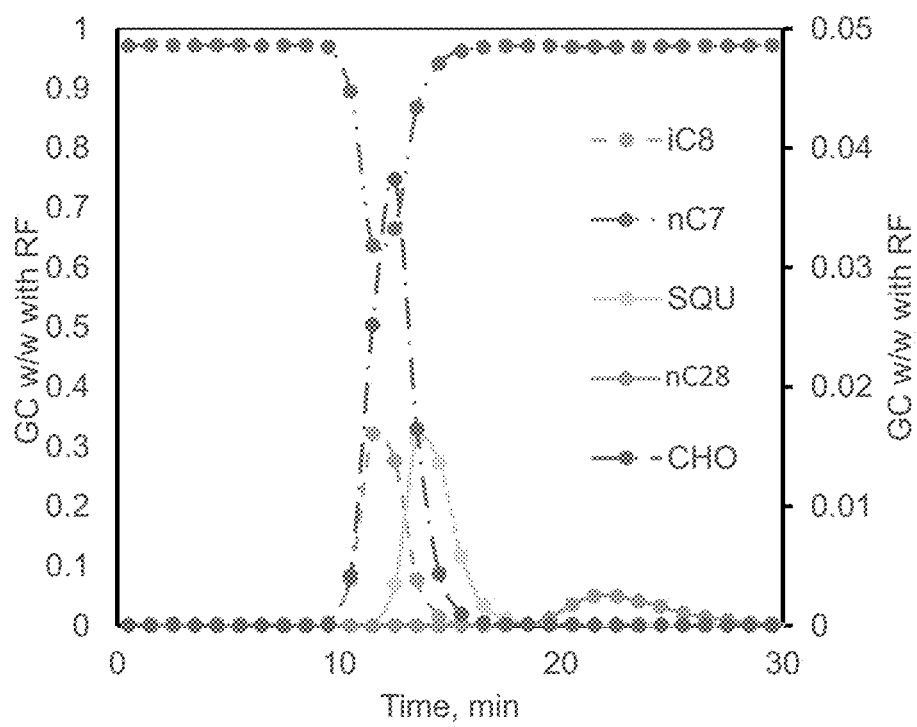
FIG. 2 is a graph showing that highly branched paraffin squalene and n-paraffin n-C28 adsorb better than multi-ring naphthene cholestane as described in Example 1.

FIG. 2 is a chart showing that highly branched paraffin squalane and n-paraffin nC28, are adsorbed more strongly than the multi-ring naphthene cholestane. The n-paraffin has the greatest adsorption. Isoparaffin in the base stock are likely to be adsorbed similarly, in between the n-paraffin and the highly branched squalane, and separated from multi-ring naphthenes.

Example 2

Competitive Adsorption of High VI Isoparaffinic Components

Group II base stock (for example EHC-45), having a VI of 115, a kinematic viscosity of 4.67 cSt at 100° C., a saturates content of greater than 96.8%, and sulfur less than 3 mg/kg was separated using the methodology and the adsorbent of Example 1. The lubricating oil was combined with a small amount of the model hydrocarbon feedstock components described in Example 1 to serve as tracers for the separation.

Figure 3:
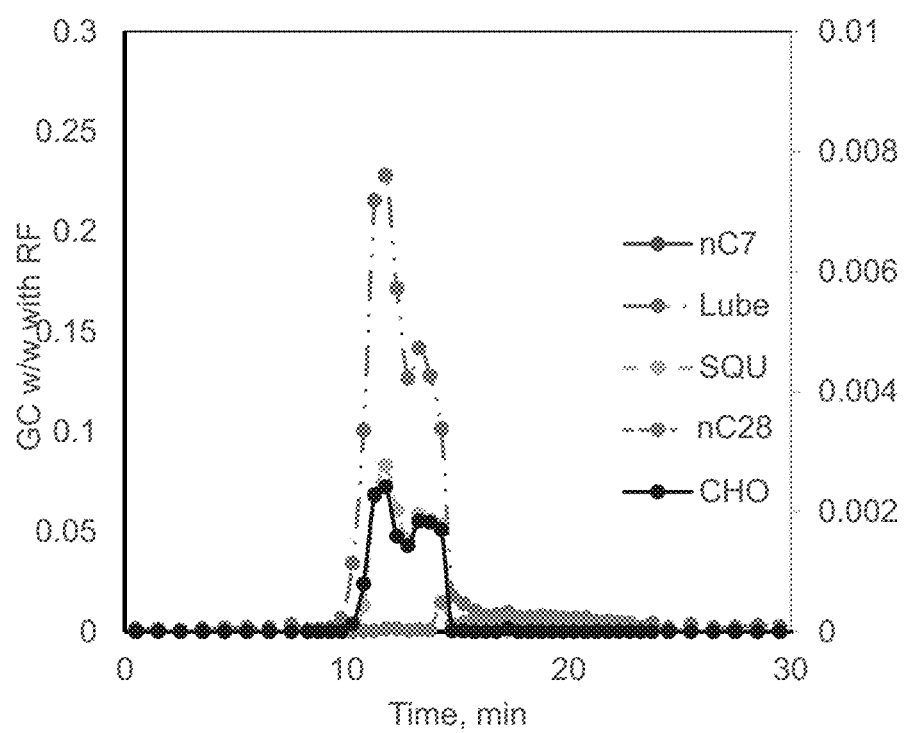
FIG. 3 is a graph of the results of Example 2 showing the shift in the elution pattern as a result of competitive adsorption.

The zeolite Beta adsorbent in column of Example 1 was used. A 0.4 ml pulse of the Group II base stock (for example EHC-45) blend was injected, with n-heptane flow at 0.4 ml/min and the column at 150° C. and about 60 bar. As shown in FIG. 3, the oil sample was partially separated by the adsorbent. Both the cholestane and squalane tracers co-eluted with the "oil". The n-octacosane tracer was adsorbed, but eluted earlier and over a broader time than obtained using the model hydrocarbon feedstock of Example 1. As shown in FIG. 3, a shift in the elution pattern is a result of competitive adsorption of high VI isoparaffinic components in the Group II base stock.

Example 3

Separation of Isoparaffins

Figure 4A:
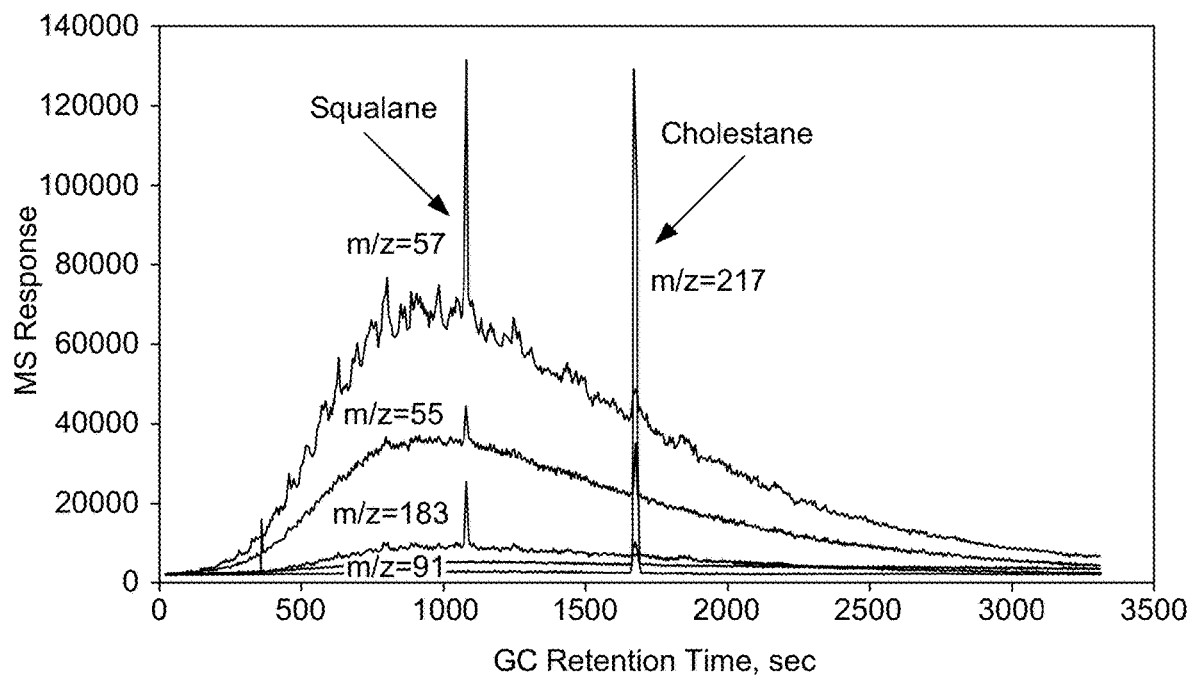
FIG. 4A is a GC-MS profile of the specific ion trace lube fraction of Example 3 at 12 to 13 minutes.
Figure 4B:
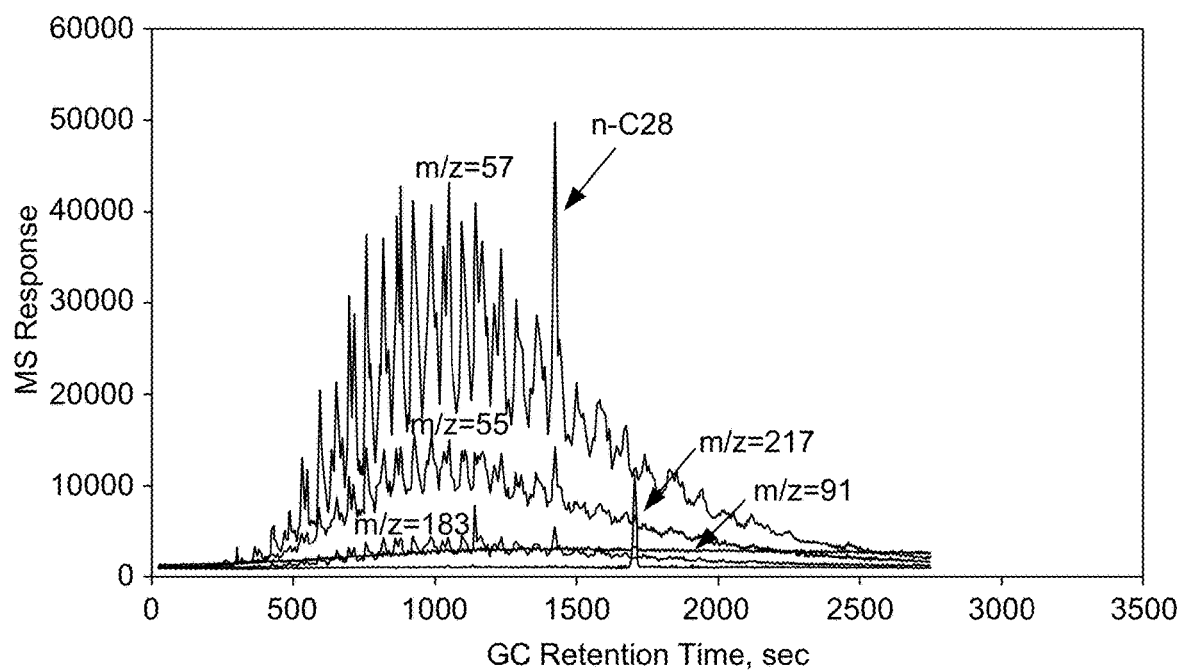
FIG. 4B is a GC-MS profile of the specific ion trace lube fraction of Example 3 at 16 to 17 minutes.

Sample fractions from an experiment run as described in Example 2 were taken at 12 to 13 minutes, corresponding to the first lube oil peak, and 16 to 17 minutes, corresponding to the tail of the second lube oil peak. These samples were analyzed by gas chromatography-mass spectrometry (GC-MS). The results are shown in FIG. 4A and FIG. 4B respectively. These traces show extracted ion chromatograms of m/z 55 and 57 to represent naphthenes and paraffins, m/z 91 for alkylbenzenes, while m/z 183 and m/z 217 are representative of squalane, cholestane, respectively. As shown in FIG. 4A, the results indicate mostly naphthenes eluting with cholestane and squalane. As shown in FIG. 4B, primarily isoparaffins were eluting with n-octacosane. The distinct separation of isoparaffins is shown in FIG. 4B with m/e=57 as compared with an essentially indistinct mound as shown in FIG. 4A.

Example 4

Separation of Higher VI Isoparaffins from Lower VI Naphthenes for a Group III Base Stock A Group III base stock (for example Yubase4), having a VI of 126, a kinematic viscosity of 4.271 cSt at 100° C., a saturates content of greater than 96.5%, and sulfur less than 3 mg/kg was separated using the methodology and adsorbent as detailed in Example 1, with two solvents. The lubricating oil was combined with a small amount of the model hydrocarbon feedstock components described in Example 1 to serve as tracers for the separation.

The zeolite Beta adsorbent column of Example 1 was used. Again, a 0.4 ml pulse of the Group III base stock blend was injected, with isooctane flow at 0.4 ml/min and the column at 150° C. and about 50 bar. The solvent was changed to n-heptane 30 minutes into the experiment, breaking through the column at 45 minutes.

Figure 5:
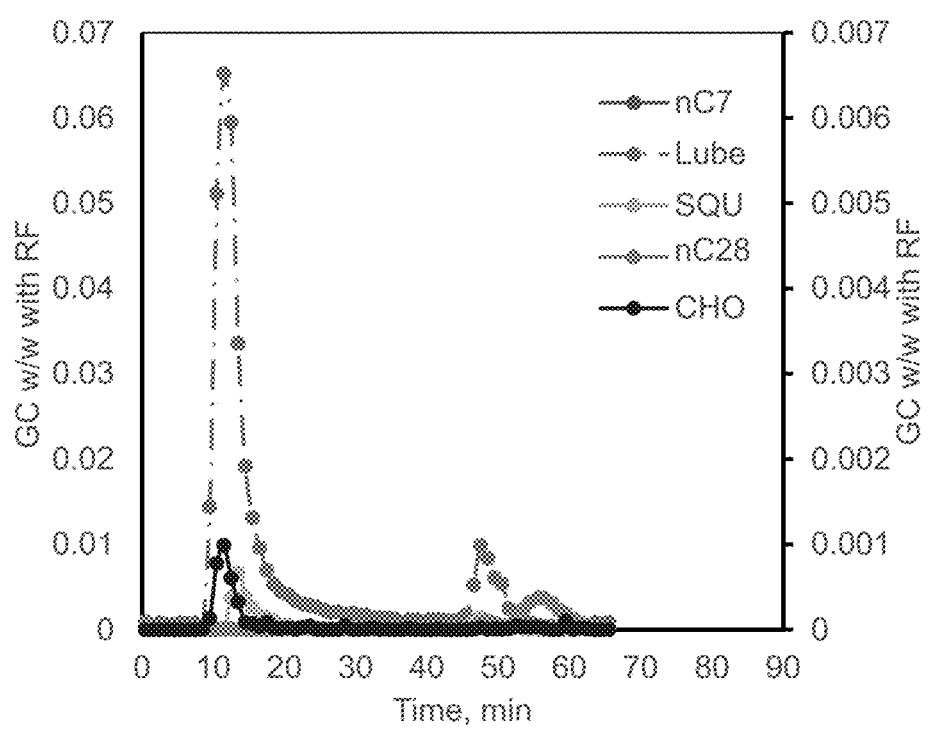
FIG. 5 is a graph showing the separation of a Group III base stock using two solvents as described in Example 4.

As shown in FIG. 5, the oil sample was separated by the adsorbent. Both the cholestane and squalane tracers co-eluted with the "oil", although with isooctane solvent the separation of cholestane and squalane is evident. The n-octacosane tracer was strongly adsorbed in isooctane, but eluted in n-heptane shortly after the lube oil fraction. In this experiment about 10% of the Group III base stock was eluted in the n-heptane fraction. The isoparaffins in this oil fraction have higher VI and could result in a Group III+ lubricating oil. The results demonstrate the separation of higher VI isoparaffins from lower VI naphthenes using the zeolite Beta adsorbent and the present methods.

Example 5

Separation of Group III Base Stock

The 100 to 200 mesh zeolite Beta containing adsorbent/catalyst from Example 1 was packed into a larger column 200 mm long×10.2 mm ID. The column contained 8.66 g/16.353 cc of adsorbent after drying at 150° C. Initial isooctane solvent flow through the column was established at 2.0 ml/min at 150° C. and 800 psig.

A Group III lubricating oil base stock (for example Yubase4), having a KV40 19.56 cSt KV100 4.271 cSt, a VI of 126 and a pour point of −18° C. all by ASTM test methods was chosen as the hydrocarbon feedstock. Compositional analysis by GC NOISE and UV indicated this Group III base stock consisted of 55.6% paraffins, 24.2% 1-ring naphthenes, about 20.0% multi-ring naphthenes and less than 0.2% aromatics all by wt. %.

Figure 6:
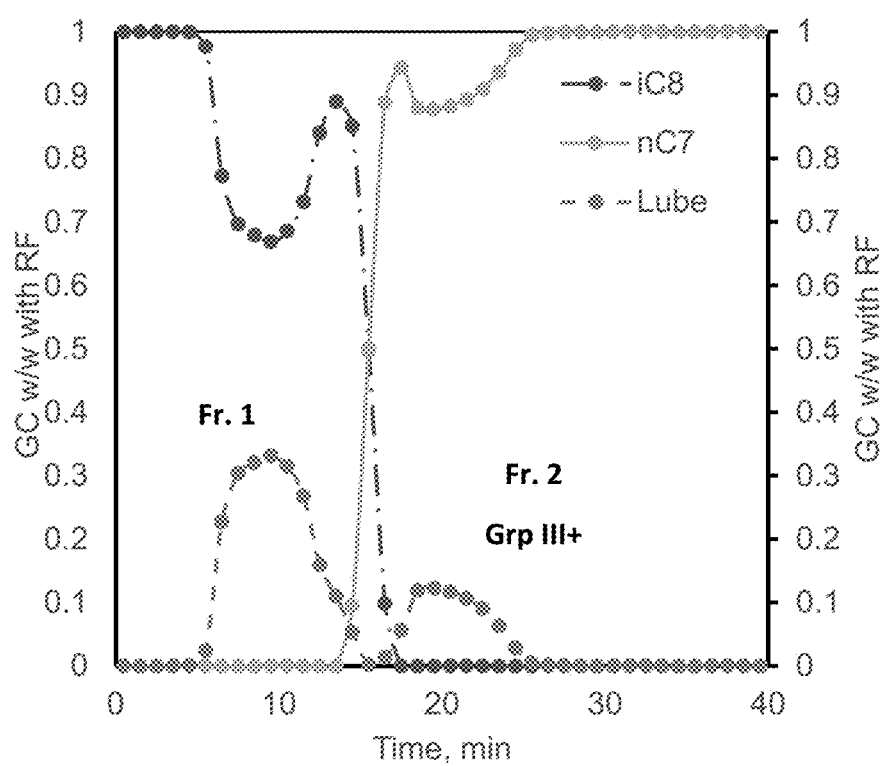
FIG. 6 is a graph showing the results of Example 5 and showing two distinct base stock peaks.

As shown in FIG. 6, a 5 ml pulse of this oil was introduced and eluted for 11.5 minutes with isooctane. The solvent was then changed to n-heptane at 2.0 ml/min and the flow reversed through the column by means of a backflush valve. Fractions collected at one-minute intervals, and analyzed by GC, indicated two distinct lube oil peaks.

This separation was repeated ten times. The first fraction base stock and the second fraction base stock, respectively, were collected from 5 to 15 minutes, and 15 to 27 minutes and composited. The solvent was evaporated with nitrogen until the oil was free of solvent by GC. Yields and properties are shown in Table 2. The VI of a first fraction base stock decreased from 126 in the hydrocarbon feedstock to 117, resulting in 82% yield of Group II product. The pour point of the first fraction base stock decreased slightly from −18° to −23° C. The VI of the second fraction base stock increased to 132, with a slight reduction in KV100 from 4.27 to 4.03 cSt, resulting in 18% yield of Group III+(greater than 130 VI) potential lube base stock.

TABLE 2

Lube Oil Fraction Yields and Properties

| Lube | Yubase4 | First Fraction Base Stock | Second Fraction Base Stock |
|---|---|---|---|
| Group | Group III | Group II | Group III+ |
| Yield, w/w | 1.00 | 0.82 | 0.18 |
| VI | 126 | 116.8 | 132.8 |
| KVcSt40C | 19.56 | 19.80 | 17.49 |
| KVcSt100C | 4.27 | 4.20 | 4.04 |

In these experiments it was noted that a small amount of cracking of the lubricating oil was occurring on the MZ-30 dual functional acidic-platinum zeolite Beta adsorbent/catalyst, even at the low 150° C. separation temperature. While the impact on the properties measured was likely minimal, further experiments were conducted using a zeolite Beta adsorbent with much lower acidity and no platinum metal function.

Example 6

Separation with Non-Acidic Adsorbent

A non-acidic zeolite Beta adsorbent, extrudate sized to 100 to 200 mesh, was prepared by ion exchange of an alumina bound zeolite Beta (65% zeolite) with 5:1 vol./wt. 1 M NaCl solution. After a water wash to remove excess salt solution and drying, the adsorbent designated Na-exchanged-Zeolite Beta (Na-Beta) was evaluated for separation of isoparaffins and other high VI components from a base stock.

The Na-Beta adsorbent was packed into a column 200 mm long×10.2 mm ID. The column contained 8.39 g/16.35 cc of adsorbent after drying at 150° C. Initial isooctane solvent flow through the column was established at 2.0 ml/min at 150° C. and 800 psig. The Group III base stock of Example 6 (e.g. Yubase4) having a KV40 19.56 cSt, KV100 4.271 cSt, a VI of 126 and a pour point of −18° C. was chosen as the hydrocarbon feedstock.

Figure 7:
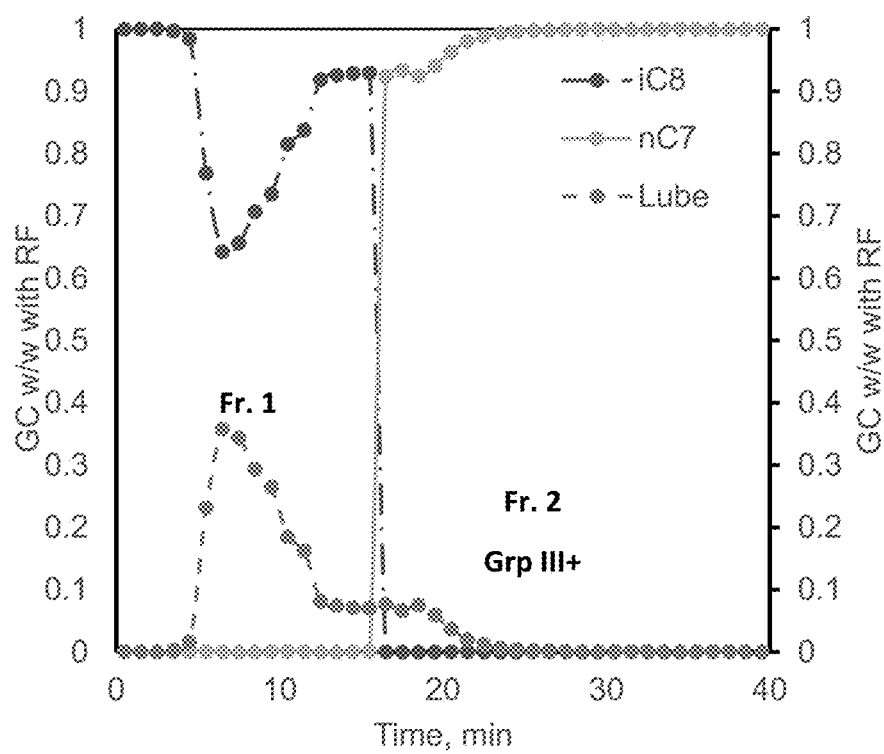
FIG. 7 is a graph showing the results of Example 6 and showing two distinct base stock peaks after separation with non-acidic adsorbent.

A 5 ml pulse of this oil was introduced and eluted for 11.5 minutes with isooctane. The solvent was then changed to n-heptane at 2.0 ml/min and the flow reversed through the column by means of a backflush valve. As shown in FIG. 7, the first fraction base stock and the second fraction base stock were collected at one-minute intervals, and analyzed by GC, indicated two distinct lube oil peaks. This separation was repeated eleven times.

The first fraction base stock and the second fraction base stock, respectively, were collected from 0 to 15 minutes, and 15 to 43 minutes and composited. The solvent was evaporated with nitrogen until the oil was free of solvent by GC. Yields and properties are shown in Table 3. The VI of the first fraction base stock decreased from 126 in the hydrocarbon feedstock to 119.9, resulting in 90.6% yield of Group II+ product. The pour point of the first fraction base stock decreased slightly from −18° to −20° C. The VI of the second fraction base stock increased to 138, with a slight reduction in KV100 from 4.27 to 4.00 cSt, resulting in 9.4% yield of Group III+ (greater than 130 VI) potential lube base stock.

TABLE 3

Lube Oil Fraction Yields and Properties

| Lube | Yubase4 | First fraction base stock | Second fraction base stock |
|---|---|---|---|
| Group | Group III | Group II | Group III+ |
| Yield, w/w | 1.00 | 0.91 | 0.09 |
| VI | 126 | 119.9 | 138.5 |
| KVcSt40C | 19.56 | 19.52 | 16.89 |
| KVcSt100C | 4.27 | 4.20 | 4.00 |

As shown in FIG. 7, the results obtained with the non-acidic adsorbent of this example compare favorably with those obtained in Example 5. Cracking of hydrocarbons was effectively eliminated by use of the metal free non-acidic zeolite Beta adsorbent.

Example 7

High VI Base Stock Provided with Acceptable Yields of Group III+ Product

The non-acidic adsorbent column used in Example 6 was used to separate the Group III base stock (for example Yubase4) lubricating oil at lower total loading. The oil was diluted to 10% w/w concentration in isooctane. A 5.0 ml pulse of the diluted oil was introduced at the conditions noted in Example 7. This effectively reduced the oil loading by a factor of 10. Backflush and solvent change to nC7 at 11.5 minutes into the run. Separation was repeated 37 times. The first fraction base stock and the second fraction base stock, respectively, were collected from 0 to 14 minutes, and 14 to 30.5 minutes and composited. As shown in Table 4, the solvent was evaporated with nitrogen until the oil was free of solvent by GC. Yields and properties. The VI of the first fraction base stock decreased from 126 in the hydrocarbon feedstock to 112, resulting in 71.6% yield of Group II+ (VI greater than 1110) product. The VI of the second fraction base stock increased to 151, with a slight reduction in KV100 from 4.27 to 3.83 cSt, resulting in 26.4% yield of Group III+ (greater than 130 VI) potential lube base stock.

TABLE 4

Lube Oil Fraction Yields and Properties

| Lube | Yubase4 | First fraction base stock | Second fraction base stock |
|---|---|---|---|
| Group | Group III | Group II+ | Group III+ |
| Yield, w/w | 1.00 | 0.73 | 0.27 |
| VI | 126 | 111.5 | 151.1 |
| KVcSt40C | 19.56 | 21.45 | 15.19 |
| KVcSt100C | 4.27 | 4.36 | 3.83 |

Figure 8:
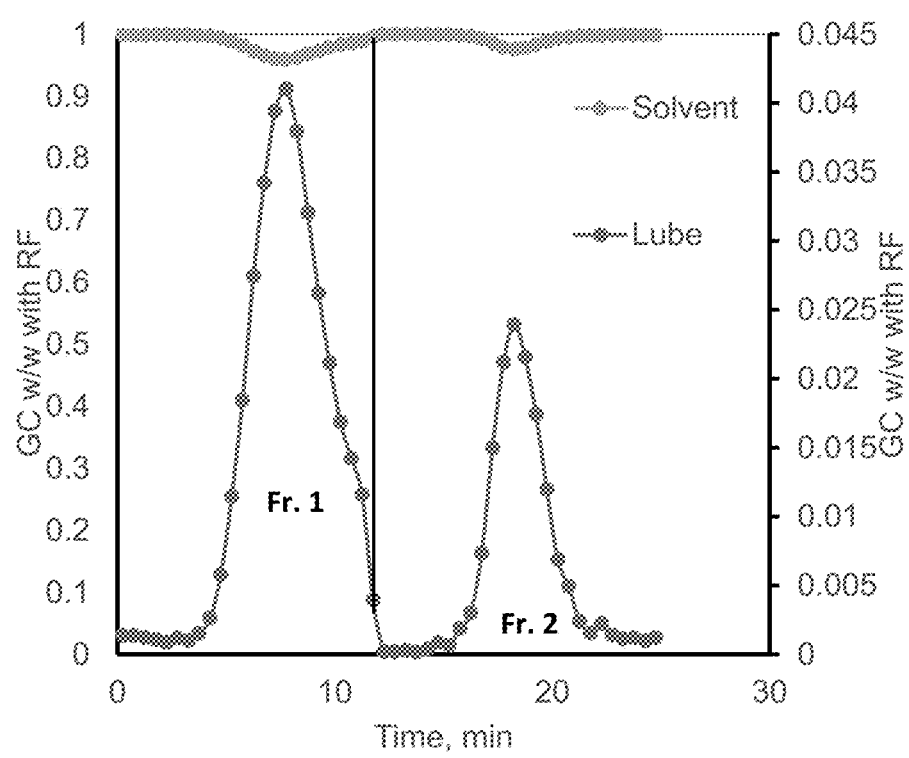
FIG. 8 is a graph showing the results of Example 7 where backflush and solvent was initiated at 11.5 minutes.

As shown in FIG. 8, the results show that high VI base stock can be obtained at acceptable yields on hydrocarbon feedstock from conventional commercial base stock.

Example 8

Conventional Commercial Base Stock as the Hydrocarbon Feedstock

The non-acidic adsorbent column used in Example 7 above was used to separate the Yubase4 lubricating oil. The oil was diluted to 10% w/w concentration in isooctane. A 5.0 ml pulse of the diluted oil was introduced at the conditions noted. 10% Yubase4 was dissolved in isooctane. The back flush and solvent change to nC7 was at 11.5 minutes into the run.

This separation was repeated thirty-two (32) times to collect adequate sample for physical property measurements. Fractions 1 and 2 respectively were collected from 0 to 14 minutes, and 14 to 30.5 minutes and composited. The solvent was evaporated with nitrogen until the oil was free of solvent by GC. Table 5 provides yields and base stock properties. The VI of the first fraction base stock decreased from 126 in the hydrocarbon feedstock to 112, resulting in 71.6% yield of Group II+(VI greater than 1110) product.

The VI of the second fraction base stock increased to 149.5, with a slight reduction in KV100 from 4.67 to 4.09 cSt, resulting in 25.3% yield of Group III+ (greater than 130 VI) potential lube base stock. This VI is typically attainable only when processing purely paraffinic feeds, such as Fisher-Tropsch wax or refined wax.

TABLE 5

Improved Yields and Properties Low Loading EHC-45 on Na-Beta

| Lube | EHC-45 | First fraction base stock | Second fraction base stock |
|---|---|---|---|
| Group | Group II | Group II | Group III+ |
| Yield, w/w | 1.00 | 0.75 | 0.25 |
| VI | 115 | 104.3 | 149.5 |
| KVcSt40C | 23.61 | 27.19 | 16.89 |
| KVcSt100C | 4.67 | 4.93 | 4.09 |

Figure 9:
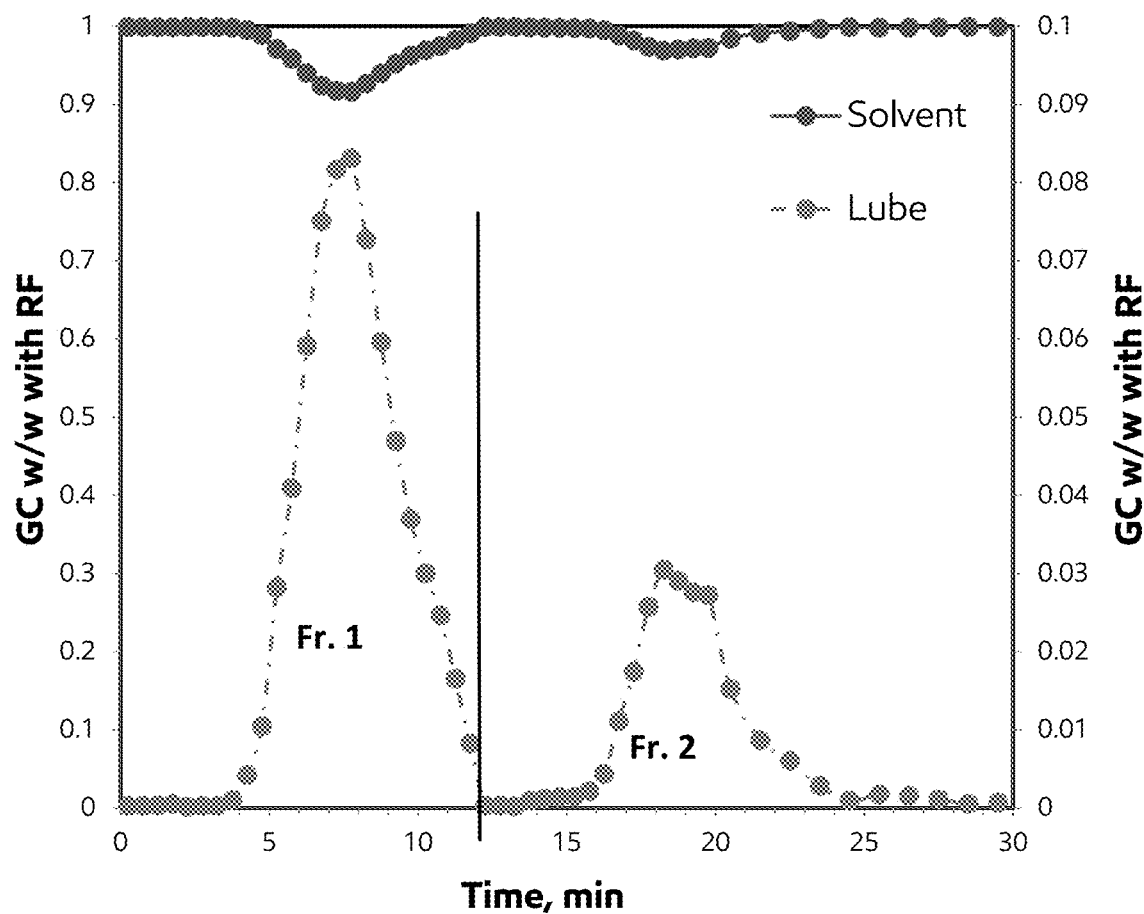
FIG. 9 is a graph showing the results of Example 8 where high VI base stock was obtained at acceptable yield from conventional commercial base stock.

As shown in FIG. 9 and presented in Table 5 above, high VI base stocks can be obtained at acceptable yields on the hydrocarbon feedstock when a conventional commercial base stock All numerical values within the detailed description and the claims can modified by "about" or "approximately" the indicated value, taking into account experimental error and variations.

For the sake of brevity, only certain ranges are explicitly disclosed herein. However, ranges from any lower limit can be combined with any upper limit to recite a range not explicitly recited, as well as, ranges from any lower limit can be combined with any other lower limit to recite a range not explicitly recited, in the same way, ranges from any upper limit can be combined with any other upper limit to recite a range not explicitly recited.

Additionally, within a range includes every point or individual value between its end points even though not explicitly recited. Thus, every point or individual value can serve as its own lower or upper limit combined with any other point or individual value or any other lower or upper limit, to recite a range not explicitly recited.

Many alterations, modifications, and variations will be apparent to those skilled in the art in light of the foregoing description without departing from the spirit or scope of the present disclosure and that when numerical lower limits and numerical upper limits are listed herein, ranges from any lower limit to any upper limit are contemplated.

What is claimed is:

1. A method of making a high quality isoparaffinic base stock comprising the steps of:
    providing a hydrocarbon feedstock having a hydrocarbon feedstock viscosity index comprising one or more high VI components;
    providing a first solvent;
    contacting an adsorbent material with the hydrocarbon feedstock and the first solvent;
    separating at least some of the one or more high VI components from the hydrocarbon feedstock to produce a first fraction base stock having a first fraction base stock viscosity index;
    contacting the adsorbent material with a second solvent; and
    desorbing the adsorbent material to produce a second fraction base stock having a second fraction base stock viscosity index, wherein the first fraction base stock viscosity index is less than the hydrocarbon feedstock viscosity index and the second fraction base stock viscosity index is greater than the hydrocarbon feedstock viscosity index,
    wherein the method further comprises the step of contacting a nanofiltration membrane with the first fraction base stock and/or the second fraction base stock to recover the first solvent, the second solvent and/or a combination thereof and produce a recovered solvent.

2. The method of claim 1, wherein the first fraction base stock has a T5 boiling point of about 400° F. and a T95 boiling point of about 1400° F.

3. The method of claim 1, wherein the second fraction base stock has a T5 boiling point of about 400° F. and a T95 boiling point of about 1400° F.

4. The method of claim 1, wherein the difference between the first fraction base stock viscosity index and the hydrocarbon feedstock viscosity index is equal to or greater than 5 as measured by ASTM D 2270-74.

5. The method of claim 1, wherein the difference between the second fraction base stock viscosity index and the hydrocarbon feedstock viscosity index is equal to or greater than 5 as measured by ASTM D 2270-74.

6. The method of claim 1, wherein the difference between the first fraction base stock viscosity index and the second fraction base stock viscosity index is equal to or greater than 5 as measured by ASTM D 2270-74.

7. The method of claim 1, wherein the first fraction base stock has a first fraction viscosity index of less than or equal to 120.

8. The method of claim 1, wherein the second fraction base stock has a second fraction viscosity index of greater than 120.

9. The method of claim 1, wherein one or more additional fractions are produced, wherein each additional fraction has an additional fraction viscosity index and each additional fraction viscosity index is equal to or greater than the second fraction base stock.

10. The method of claim 1, wherein the adsorbent material is a molecular sieve.

11. The method of claim 10, wherein the molecular sieve comprises a zeolite Beta.

12. The method of claim 10, wherein the at least some of the one or more high VI components are adsorbed onto the molecular sieve.

13. The method of claim 10, wherein the molecular sieve has a ring size of 11 rings or greater, a pore size of 5.9 Å or greater, and a crystal size of about 0.5 microns or less.

14. The method of claim 1, further comprising the step of recovering the first solvent or the second solvent and/or a combination thereof to produce a recovered solvent.

15. The method of claim 1, wherein the adsorbent material is contacted with the recovered solvent.

16. The method of claim 1, wherein the step of separating the high VI components is performed at a temperature between about 20° C. to about 300° C. at a pressure between about 600 psi and about 1500 psi.

17. The method of claim 1, wherein the step of desorbing the adsorbent material is performed at a temperature between about 50° C. to about 225° C. at a pressure between about 600 psi and about 1000 psi.

18. The method of claim 1, wherein the boiling point of the first solvent and the second solvent are less than the boiling point of the feedstock.

19. The method of claim 1, wherein the first fraction base stock and the second fraction base stock comprise greater than or equal to 90% saturates.

20. The method of claim 1, wherein the first fraction base stock and the second fraction base stock comprise 0.3 wt. % or less sulfur.

21. The method of claim 1, further comprising removing the first solvent and/or the second solvent from the first fraction base stock and/or the second fraction base stock prior to measuring the first fraction base stock viscosity index and/or the second fraction base stock viscosity index.

22. A method of upgrading Group II base stock to Group $II_+$, Group III or Group $III_+$ base stock comprising the steps of:
adsorbing one or more high VI components of a first Group II base stock having a first Group II viscosity index with a Beta zeolite, wherein the first Group II base stock and a first solvent contact the Beta zeolite to provide a second Group II base stock having a viscosity index less than the first Group II base stock viscosity index; and
desorbing the Beta zeolite, wherein the Beta zeolite is contacted with the first solvent or a second solvent to produce a Group $II_+$, Group III or Group $III_+$ base stock having a viscosity index greater than 120.

23. The method of claim 22, further comprising the step of recovering the first solvent and/or the second solvent from the second Group II base stock, the Group $II_+$ base stock, the Group III base stock and/or Group $III_+$ base stock.

24. A system for making a high quality isoparaffinic base stock comprising:
an adsorption bed comprising a molecular sieve, wherein the molecular sieve has a ring size of 11 rings or high, a pore size less than 5.9 Å or greater, and a crystal size of about 0.5 microns or less;
a reservoir comprising at least one hydrocarbon feedstock fluidically connected to the molecular sieve, wherein the hydrocarbon feedstock has a hydrocarbon feedstock viscosity index and one or more high VI components;
a source of one or more solvents fluidically connected to the molecular sieve; and
a solvent recovery system in fluidic communication with the molecular sieve and comprises a nanofiltration membrane for solvent recovery,
wherein the molecular sieve is contacted with a first solvent from the supply and/or the solvent recovery system to produce a first fraction base stock having a first fraction base stock viscosity index less than the hydrocarbon feedstock viscosity index wherein at least a portion of the one or more high VI components are adsorbed onto the molecular sieve, and the molecular sieve is desorbed with the first solvent and/or a second solvent or combination thereof to produce a second fraction base stock, the second fraction base stock having a second fraction base stock viscosity index greater than the hydrocarbon feedstock viscosity index, and the first solvent and/or the second solvent are recovered from the nanofiltration membrane.

25. The system of claim 24, further comprising one or more distillation columns for stripping solvent from the first fraction base stock and/or second fraction base stock.

26. The system of claim 24, wherein the molecular sieve comprises zeolite Beta.

* * * * *